R. F. SMITH.
EDUCATIONAL APPLIANCE.
APPLICATION FILED SEPT. 14, 1909.

964,064.

Patented July 12, 1910.

Witnesses
W. N. Woodson
Juana M. Fallin

Inventor
R. F. Smith

By
Attorneys

THE NORRIS PETERS CO., WASHINGTON, D. C.

UNITED STATES PATENT OFFICE.

RAYMOND F. SMITH, OF ALLEGANY, NEW YORK.

EDUCATIONAL APPLIANCE.

964,064.

Specification of Letters Patent. Patented July 12, 1910.

Application filed September 14, 1909. Serial No. 517,663.

*To all whom it may concern:*

Be it known that I, RAYMOND F. SMITH, a citizen of the United States, residing at Allegany, in the county of Cattaraugus and State of New York, have invented certain new and useful Improvements in Educational Appliances, of which the following is a specification.

My invention relates to educational appliances and particularly to an appliance for teaching pupils to recognize quickly the total number or the total character of a number of units in a group of similar objects.

The object of the invention is to provide means for training the pupils to the quick recognition of the total number of objects in a group without resorting to counting, and also to exercise and train the faculties of perception and visualization, thereby increasing the power of the pupil's mind particularly in the direction of alertness and accuracy of observation to form clear mental concepts.

Broadly the invention consists of means for supporting any desired number of objects before the eyes of the pupils and then causing certain objects to disappear behind a screen before the pupils have had time to count the objects one at a time or to observe the character of each object taken separately.

For a full understanding of the invention reference is to be had to the following description and accompanying drawings, in which:—

Figure 1:
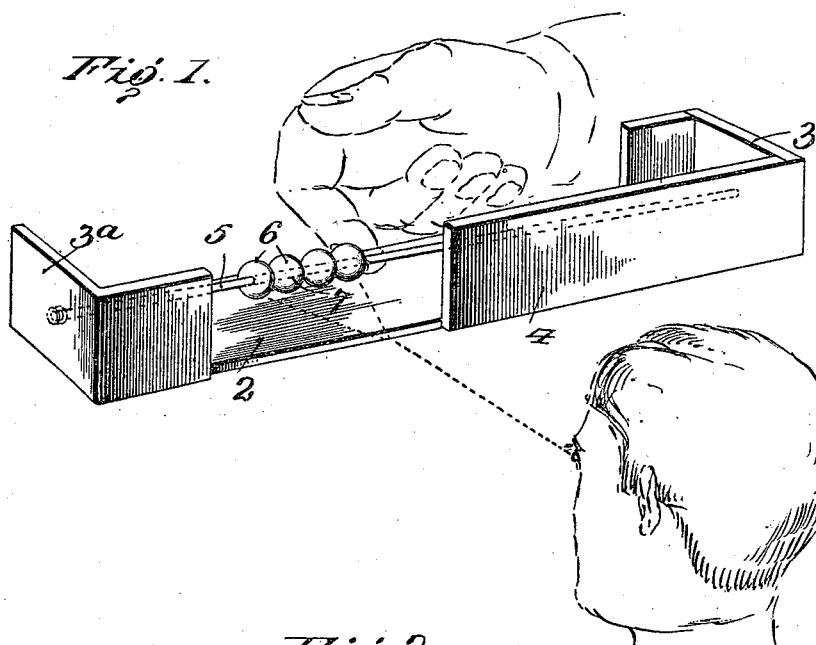
Figure 2:
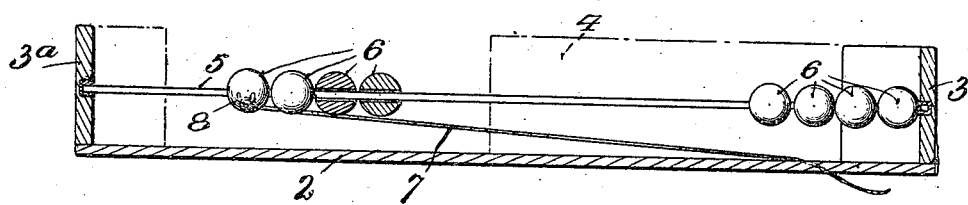
Figure 3:
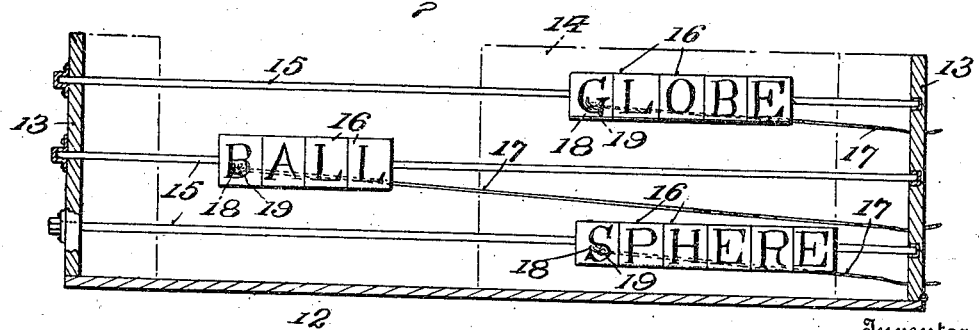
Figure 4:
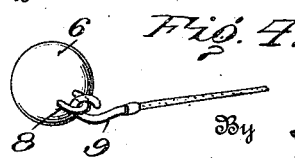

Figure 1 is a perspective view of my appliance showing its manner of operation, Fig. 2 is a longitudinal sectional view of the appliance, Fig. 3 is a longitudinal sectional view showing a modified form of the appliance, and Fig. 4 is a detailed perspective view showing the hooked connection between the elastic cord and the end ball.

Corresponding and like parts are referred to in the following description and indicated in all the views of the drawing by the same reference characters.

Referring to these figures 2 designates a base-plate of any suitable frame having at each end the supports 3 and 3ᵃ. Extending from the support 3 along the front edge of the base plate 2 and nearly to the support 3ᵃ is the screen 4. There will thus be left an open space between the extremity of the screen 4 and the support 3ᵃ. Extending from one support to the other is the rigid guiding rod 5 of any suitable character but preferably formed of a light bar of metal. Mounted upon the guiding rod 5 are a series of shiftable objects which in the form of my invention shown in Fig. 1, have the form of balls 6. These balls are pierced through the center for the reception of the rod 5 and move easily upon said rod. An elastic connection 7 is attached to the outermost of the balls 6 and at its other end is attached to any suitable fixed point. This elastic connection might have the form of a coil spring, but is shown as a rubber cord under sufficient tension to hold the balls 6 behind the screen 4. The end of the rubber cord 7 is attached by a staple 8 to the forward ball. It will be seen that with the rubber cord under tension the balls 6 will be normally held behind the screen but may be advanced into the open space between the screen and support 3ᵃ. Whenever they are released from being held before this open space the retractile connection 7 will draw the balls back to their reverse position. The retractile connection 7 is provided at its end with a hook 9 whereby the cord is connected to the staple 8 so that the cord may be detached from the first ball 6. In the practical use of this form of my invention the teacher exposes to the view of the pupils the number of balls desired, by sliding the balls along the rod and thereby extending the retractile cord 7. When released the balls immediately fly back to their original position. The spring or elastic cord 7 accomplishes the removal of the object before the pupil has had time to count them one at a time. Thus the pupils are taught to recognize the number of objects in a group without resorting to individual counting. The pupil thereby learns to quickly associate the number symbols with concrete objects and thus the symbols are rendered more tangible than they otherwise would be. When the pupil is called upon to visualize, the conception of the number which he will then have will have reference to the concrete as opposed to the abstract.

The purpose of the hook 9, whereby the elastic connection 7 may be disengaged from the first ball is to permit the teacher to conduct a drill in addition and subtraction. For instance, if four balls are exposed to view the question may be asked "Four and two equal how many?" By putting out two more in addition to the four already in sight, the answer will be verified. My device, is therefore, adapted to be used either in the manner of an abacus for addition and subtraction or as a means for training the perceptions and exercising the pupil in retentiveness or what may be termed persistence of mental vision.

Another form of my invention is shown in Fig. 3. In place of a frame supporting the bar 5 with a plurality of balls there is shown a frame supporting a plurality of rods, each rod having thereon a series of sliding objects, the elastic connection being made to the first object of each series. The sliding objects in the drawing are shown as blocks having thereon letters which have been previously arranged upon the guiding rods so as to spell words. In detail the frame consists of the end supports 13 and the base 12, the screen 14, a plurality of rods 15 and the blocks 16 mounted on the rods. The first block of each series of blocks is connected to the end support 13 by means of an elastic cord 17 or other suitable elastic retractile connection. The space between the screen 14 and the end support 13ª is of course sufficient to exhibit the series of blocks as they are drawn out behind the screen. Elastic connections 17 are attached to the foremost block of each series by means of the hooks 18 and staples 19 as before described.

It will be seen that the same faculties are to a large extent exercised by the construction just described as were exercised with the previously described device, namely, the pupils learn to see an aggregation of objects as a whole and not merely as individual units. They learn to recognize these combinations of separate units by their combinational characteristics and not their individual characteristics. By using a plurality of balls or blocks it will be seen that comparisons and contrasts may be made between one word and another, just as in the use of the former device the pupils were asked to distinguish between one number of balls and another number.

While I have found that the simple construction here shown to be very effective in use I do not wish to limit myself to these details, as it will be obvious that the spirit of my invention may be embodied in a large number of different forms.

Having thus described the invention what is claimed as new is:—

1. An educational appliance including a frame having a sight opening therethrough, means for supporting any desired number of objects upon said frame but out of view through the sight opening and permitting any number of the objects to be moved opposite the sight opening, and means for suddenly retracting the objects from the sight opening.

2. An educational appliance comprising a frame having a sight opening therein, said frame forming a screen, a fixed guide extending entirely across the frame, a plurality of objects independently movable on the guide, and means for quickly withdrawing any number of the objects behind the screen.

3. An educational appliance comprising a frame having a sight opening therethrough, said frame forming a screen, means for supporting any desired number of objects upon said frame but out of view through the sight opening and permitting any number of the objects to be moved opposite the sight opening, and means for suddenly retracting any desired number of the objects exposed from behind the sight opening.

4. An educational appliance comprising a frame, a screen extending partly across the frame and leaving a sight opening beyond the screen, a fixed guide mounted on the frame, behind the screen, and extending entirely across and beyond the screen, a series of independent sliding objects mounted upon the guide, and an elastic yielding connection between the first one of said objects and a portion of the frame behind the screen.

5. An educational appliance of the character described comprising a base, supports mounted at opposite ends of the base, a screen extending from one of the supports nearly to the other support, a guide rod mounted at opposite ends on said supports, a plurality of objects slidably mounted on the guide rod and an elastic retractile connection attached at one end to a portion of the frame behind the screen, the other end of the connection being attached to the face of the series of objects.

6. An appliance of the character described comprising a frame, a screen extending partly across the same, a guide rod extending entirely across the frame, a series of objects mounted on the guide rod and adapted to be shifted into the space between the end of the screen and the adjacent frame, an elastic connection attached at one end to the frame behind the screen, a hook on the other end of said elastic connection and means for engaging said hook with any one of said objects.

7. An educational appliance of the character described comprising a frame having opposed supports, a screen extending partly between said supports, a longitudinal rod extending between said supports, a plurality of objects shiftably mounted, and a spring acting to move said objects behind the screen and yielding to permit the objects to be moved into the space beyond the screen.

8. An educational appliance of the character described comprising a frame, a screen covering one end of the frame, a plurality of rods mounted upon the frame, sets of objects slidably mounted on each of the rods and springs for moving said objects behind the screen but yielding to permit the objects to be moved into the space beyond the screen.

9. An educational appliance comprising a frame, a screen extending partly across the frame and leaving a sight opening beyond the screen, a guide rod mounted on the frame and extending entirely across it, a series of independent sliding objects mounted on the guide rod, an elastic connection attached at one end to the frame behind the screen, and means whereby the free end of said connection may be detachably engaged to any one of the said sliding objects.

In testimony whereof I affix my signature in presence of two witnesses.

RAYMOND F. SMITH. [L. S.]

Witnesses:
 JOHN A. RYAN,
 HARRY M. KRAMPF.